(12) United States Patent
Thomas et al.

(10) Patent No.: US 11,543,868 B2
(45) Date of Patent: Jan. 3, 2023

(54) APPARATUS AND METHOD TO PROVIDE A THERMAL PARAMETER REPORT FOR A MULTI-CHIP PACKAGE

(71) Applicant: Intel Corporation, Santa Clara, CA (US)

(72) Inventors: Tessil Thomas, Bangalore (IN); Robin A. Steinbrecher, Olympia, WA (US); Sandeep Ahuja, University Place, WA (US); Michael Berktold, Phoenix, AZ (US); Timothy Y. Kam, Portland, OR (US); Howard Chin, Westford, MA (US); Phani Kumar Kandula, Bangalore (IN); Krishnakanth V. Sistla, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/898,603

(22) Filed: Jun. 11, 2020

(65) Prior Publication Data

US 2020/0301490 A1    Sep. 24, 2020

Related U.S. Application Data

(63) Continuation of application No. 14/852,859, filed on Sep. 14, 2015, now Pat. No. 10,877,530.

(30) Foreign Application Priority Data

Dec. 23, 2014   (IN) .......................... 6510/CHE/2014

(51) Int. Cl.
*G06F 1/20*         (2006.01)
*G06F 1/3296*       (2019.01)
(Continued)

(52) U.S. Cl.
CPC ............... *G06F 1/206* (2013.01); *G06F 1/20* (2013.01); *G06F 1/324* (2013.01); *G06F 1/3206* (2013.01);
(Continued)

(58) Field of Classification Search
CPC .............. G06F 1/20; G06F 1/206; G06F 1/26; G06F 1/266; G06F 1/32; G06F 1/3206;
(Continued)

(56) References Cited

U.S. PATENT DOCUMENTS 5,163,153 A    11/1992   Cole et al.
5,522,087 A     5/1996   Hsiang
(Continued)

FOREIGN PATENT DOCUMENTS

CN    101025994    2/2007
CN    103189814    7/2013
(Continued)

OTHER PUBLICATIONS

European Patent Office, Summons to Attend Oral Proceedings mailed Sep. 28, 2020 in European patent application No. 15873930. 0, 8 pages total.
(Continued)

*Primary Examiner* — Nimesh G Patel
(74) *Attorney, Agent, or Firm* — Trop, Pruner & Hu, P.C.

(57) ABSTRACT

In an embodiment, a processor includes at least one core and power management logic. The power management logic is to receive temperature data from a plurality of dies within a package that includes the processor, and determine a smallest temperature control margin of a plurality of temperature control margins. Each temperature control margin is to be determined based on a respective thermal control temperature associated with the die and also based on respective temperature data associated with the die. The power man-
(Continued)

agement logic is also to generate a thermal report that is to include the smallest temperature control margin, and to store the thermal report. Other embodiments are described and claimed.

12 Claims, 18 Drawing Sheets

(51) Int. Cl.
    *G06F 1/3206*     (2019.01)
    *G06F 1/324*     (2019.01)
    *G06F 3/041*     (2006.01)
    *G06F 11/30*     (2006.01)
    *G06F 1/32*     (2019.01)
    *G06F 1/26*     (2006.01)

(52) U.S. Cl.
    CPC .......... *G06F 1/3296* (2013.01); *G06F 3/0412* (2013.01); *G06F 11/3058* (2013.01); *G06F 1/26* (2013.01); *G06F 1/266* (2013.01); *G06F 1/32* (2013.01); *Y02D 10/00* (2018.01)

(58) Field of Classification Search
    CPC .... G06F 1/324; G06F 1/3296; G06F 11/3058; Y02D 10/00
    See application file for complete search history.

(56) References Cited

U.S. PATENT DOCUMENTS

| | | |
|---|---|---|
| 5,590,341 A | 12/1996 | Matter |
| 5,621,250 A | 4/1997 | Kim |
| 5,931,950 A | 8/1999 | Hsu |
| 6,470,289 B1 | 10/2002 | Peters et al. |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,873,883 B2 | 3/2005 | Ziarnik |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,260,007 B2 | 8/2007 | Jain et al. |
| 7,272,730 B1 | 9/2007 | Acquaviva et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,480,124 B2 | 1/2009 | Pankau et al. |
| 7,529,956 B2 | 5/2009 | Stufftebeam |
| 7,539,885 B2 | 5/2009 | Ma |
| 7,730,340 B2 | 6/2010 | Hu et al. |
| 7,925,902 B1 | 4/2011 | Radcliffe et al. |
| 8,223,025 B2 | 7/2012 | Stiver et al. |
| 8,260,474 B2 | 9/2012 | Ahuja et al. |
| 10,877,530 B2* | 12/2020 | Thomas .................. G06F 3/0412 |
| 2001/0044909 A1 | 11/2001 | Oh et al. |
| 2002/0152406 A1 | 10/2002 | Watts, Jr. et al. |
| 2002/0173858 A1 | 11/2002 | Sherlock |
| 2002/0194509 A1 | 12/2002 | Plante et al. |
| 2003/0061383 A1 | 3/2003 | Zilka |
| 2003/0229662 A1 | 12/2003 | Luick |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0178488 A1* | 9/2004 | Bolken .................. H01L 24/13 |
| | | 257/686 |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2006/0004538 A1 | 1/2006 | Cancel |
| 2006/0005082 A1* | 1/2006 | Fossum .................. G06F 9/5061 |
| | | 712/E9.055 |
| 2006/0013281 A1 | 1/2006 | Sri-Jayantha et al. |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0161375 A1 | 7/2006 | Duberstein et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156992 A1 | 7/2007 | Jahagirdar |
| 2007/0204106 A1* | 8/2007 | Donald ................ G06F 12/0862 |
| | | 711/E12.057 |
| 2007/0214342 A1 | 9/2007 | Newburn |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0250260 A1 | 10/2008 | Tomita |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2010/0115309 A1 | 5/2010 | Carvalho |
| 2010/0123234 A1* | 5/2010 | Chou .................. H01L 25/0652 |
| | | 257/686 |
| 2010/0146513 A1 | 6/2010 | Song |
| 2010/0191997 A1 | 7/2010 | Dodeja et al. |
| 2011/0154090 A1 | 6/2011 | Dixon et al. |
| 2012/0079290 A1 | 3/2012 | Kumar |
| 2012/0166015 A1 | 6/2012 | Steinbrecher et al. |
| 2012/0246506 A1 | 9/2012 | Knight |
| 2013/0061064 A1 | 3/2013 | Ananthakrishnan et al. |
| 2013/0080803 A1 | 3/2013 | Ananthakrishnan et al. |
| 2013/0080804 A1 | 3/2013 | Ananthakrishnan et al. |
| 2013/0111120 A1 | 5/2013 | Ananthakrishnan et al. |
| 2013/0111121 A1 | 5/2013 | Ananthakrishnan et al. |
| 2013/0111226 A1 | 5/2013 | Ananthakrishnan et al. |
| 2013/0111236 A1 | 5/2013 | Ananthakrishnan et al. |
| 2013/0346774 A1 | 12/2013 | Bhandaru et al. |
| 2014/0068284 A1 | 3/2014 | Bhandaru et al. |
| 2014/0068290 A1 | 3/2014 | Bhandaru et al. |
| 2014/0068293 A1 | 3/2014 | Man et al. |
| 2014/0124918 A1 | 5/2014 | Celik et al. |
| 2014/0195829 A1 | 7/2014 | Bhandaru et al. |
| 2014/0208141 A1 | 7/2014 | Bhandaru et al. |
| 2014/0365714 A1* | 12/2014 | Sweere .................. G06F 1/206 |
| | | 711/103 |
| 2016/0147280 A1 | 5/2016 | Thomas et al. |
| 2016/0147291 A1 | 5/2016 | Thomas et al. |
| 2016/0179158 A1 | 6/2016 | Thomas et al. |
| 2020/0301490 A1* | 9/2020 | Thomas ................ G06F 3/0412 |

FOREIGN PATENT DOCUMENTS

| | | |
|---|---|---|
| CN | 104137024 | 11/2014 |
| CN | 104205110 | 12/2014 |
| EP | 1 282 030 A1 | 5/2003 |
| TW | I371683 | 9/2012 |

OTHER PUBLICATIONS

Chinese Patent Office, First Office Action dated Nov. 29, 2019 in Chinese application No. 2015,80063797.2, 10 pages total.
European Patent Office, Examination Report dated Aug. 23, 2019 in European Patent Application No. 15873930.0.
Taiwan Patent Office, Decision of Rejection dated Sep. 18, 2018 in Taiwanese Patent Application No. 106116733. (Translation redacted).

(56) References Cited

OTHER PUBLICATIONS

European Patent Office, Extended European Search Report dated Jul. 31, 2018, in European Patent Application No. 15873930.0.
Taiwan Intellectual Property Office, Office Action dated Feb. 9, 2018 in Taiwan Patent Application No. 106116733. (Translation Redacted).
Beneventi, et al., "Online Thermal Emulation : How to speed-up your thermal controller design", PATMOS, pp. 99-106, IEEE Conference Publications 2013, p. 99, left column; p. 104, right column—p. 105, left column.
Taiwan intellectual Property Office. Office Action dated Dec. 8, 2016, in Taiwan Patent Application No. 104138328. (Translation Redacted).
International Searching Authority, "Notification of Transmittal of the International Search Report and the Written Opinion of the International Searching Authority," dated Feb. 26, 2016 in International application No. PCT/US2015/061517.
Intel Developer Forum, IDF2010, Opher Kahn, et al., "Intel Next Generation Microarchitecture Codename Sandy Bridge: New Processor Innovations," Sep. 13, 2010, 58 pages.
SPEC—Power and Performance, Design Overview V1.10, Standard Performance Information Corp., Oct. 21, 2008, 6 pages.
Intel Technology Journal, "Power and Thermal Management in the Intel Core Duo Processor," May 15, 2006, pp. 109-122.
Anoop Iyer, et al., "Power and Performance Evaluation of Globally Asynchronous Locally Synchronous Processors," 2002, pp. 1-11.
Greg Semeraro, et al., "Hiding Synchronization Delays In A GALS Processor Microarchitecture," 2004, pp. 1-13.
Joan-Manuel Parcerisa, et al., "tfficient Interconnects for Clustered Microarchitectures," 2002, pp. 1-10.
Grigorios Magklis, et al., "Profile-Based Dynamic Voltage and Frequency Scaling for a Multiple Clock Domain Microprocessor," 2003, pp. 1-12.
Greg Semeraro, et al., "Dynamic Frequency and Voltage Control for a Multiple Clock Domain Architecture," 2002, pp. 1-12.
Greg Semeraro, "Energy-Efficient Processor Design Using Multiple Clock Domains with Dynamic Voltage and Frequency Scaling," 2002, pp. 29-40.
Diana Marculescu, "Application Adaptive Energy Efficient Clustered Architectures," 2004, pp. 344-349.
L. Benini, et al., "System-Level Dynamic Power Management," 1999, pp. 23-31.
Ravindra Jejurikar, et al., "Leakage Aware Dynamic Voltage Scaling For Real-Time Embedded Systems," 2004, pp. 275-280.
Ravindra Jejurikar, et al., "Dynamic Slack Reclamation With Procrastination Scheduling In Real-Time Embedded Systems," 2005, pp. 13-17.
R. Tooling, et al., "Some Strategies For Kalman Filtering and Smoothing," 1996, pp. 1-21.
R.E. Kalman, "A New Approach To Linear Filtering and Prediction Problems," 1960, pp. 1-12.
Intel Corporation, "Intel 64 and IA-32 Architectures Software Developer's Manual," vol. 3 (3A, 3B & 3C): System Programming Guide, Feb. 2014, Chapter 14 Power and Thermal Management (14.1-14.9.5), 44 pages.
U.S. Appl. No. 16/898,603, filed Jun. 11, 2020, entitled "Apparatus and Method to Provide a Thermal Parameter Report for a Multi-Chip Package," by Tessil Thomas.
Indian Patent Office, Examination Report dated Aug. 30, 2019 in Indian patent application No. 6510/CHE/2014, 5 pages total.
European Patent Office, European Search Report dated Jan. 14, 2021 in European patent application serial No. 20203849.3, 8 pages total.
European Patent Ofhice, Preliminary Opinion dated Mar. 5, 2021 in European Patent Application No. 15873930.0 (6 pages).
European Patent Office, Minutes of the Oral Proceedings mailed Apr. 19, 2021 in European Patent Application No. 15873930.0 (6 pages).
Chinese Patent Office, Second Office Action dated Sep. 8, 2020 in Chinese patent application serial No. 201580063797.2, 19 pages total.
Chinese Patent Office, Third Office Action dated Feb. 7, 2021 in Chinese patent application serial No. 201580063797.2, 17 pages total.
Indian Patent Office, Response to Office Action dated Aug. 29, 2022 in Indian Patent Application No. 202042045703 (12 pages).
Indian Patent Office, Office Action dated Feb. 28, 2022 in Indian Patent Application No. 202042045703 (4 pages).

\* cited by examiner

APPARATUS AND METHOD TO PROVIDE A THERMAL PARAMETER REPORT FOR A MULTI-CHIP PACKAGE

This application is a continuation of U.S. patent application Ser. No. 14/852,859, filed Sep. 14, 2015, which claims priority under 35 U.S.C. § 119(b) to Indian Application No. 6510/CHE/2014, filed in India with the India Patent Office on Dec. 23, 2014, the content of which is hereby incorporated by reference.

TECHNICAL FIELD

Embodiments relate to power management of a system, and more particularly to power management of a multichip package that includes a processor.

BACKGROUND

Advances in semiconductor processing and logic design have permitted an increase in the amount of logic that may be present on integrated circuit devices. As a result, computer system configurations have evolved from a single integrated circuit to a system that may involve multiple hardware threads, multiple cores, multiple devices, and/or complete systems on individual integrated circuits. Additionally, as the density and performance of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™ tablets, mobile phones, processors, embedded systems, etc. become even more prevalent (from inclusion in the typical computer, automobiles, and televisions to biotechnology).

DETAILED DESCRIPTION

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Figure 1:
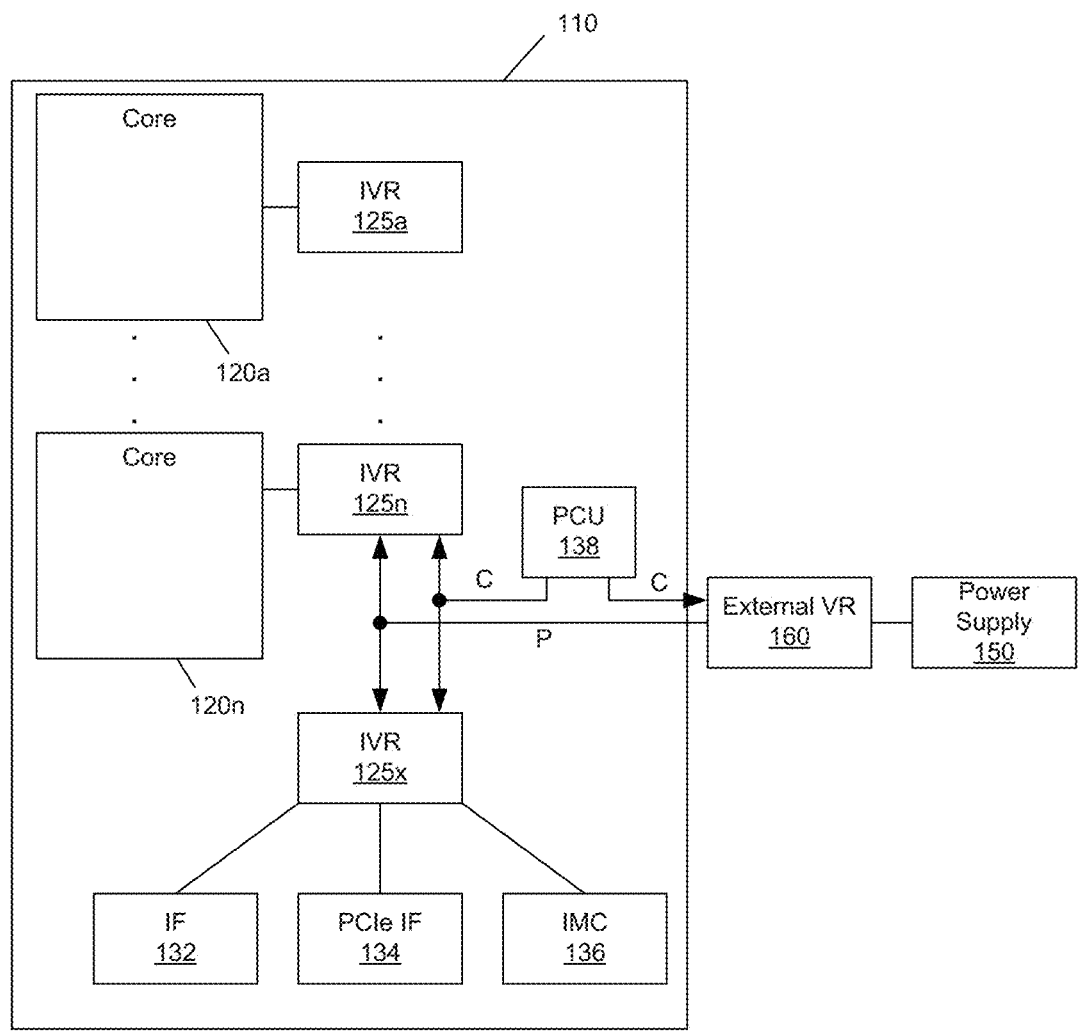
FIG. 1 is a block diagram of a portion of a system in accordance with an embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle. Although described with these particular examples, understand that many other power management techniques may be used in particular embodiments.

Figure 2:
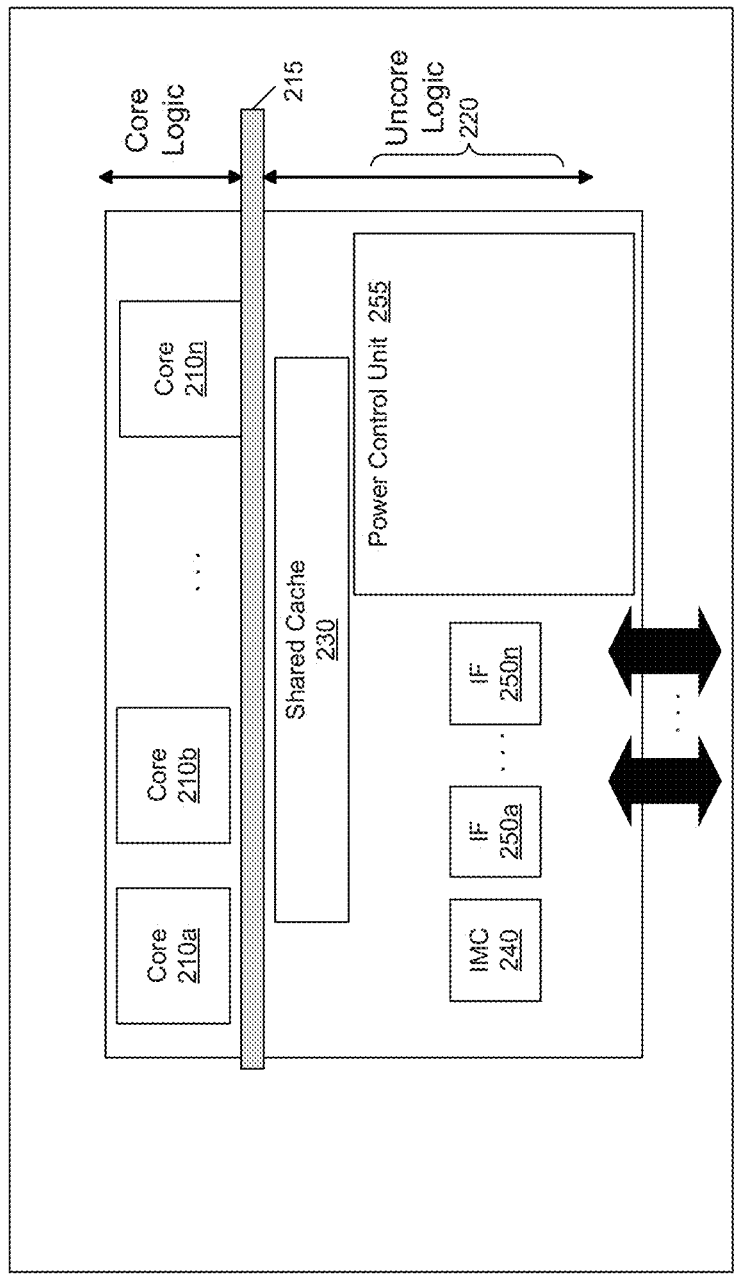
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload. The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250 and a power control unit 255, which may include logic to perform the power management techniques described herein.

In addition, by interfaces 250a-250n, connection can be made to various off-chip components such as peripheral devices, mass storage and so forth. While shown with this particular implementation in the embodiment of FIG. 2, the scope of the present invention is not limited in this regard.

Figure 3:
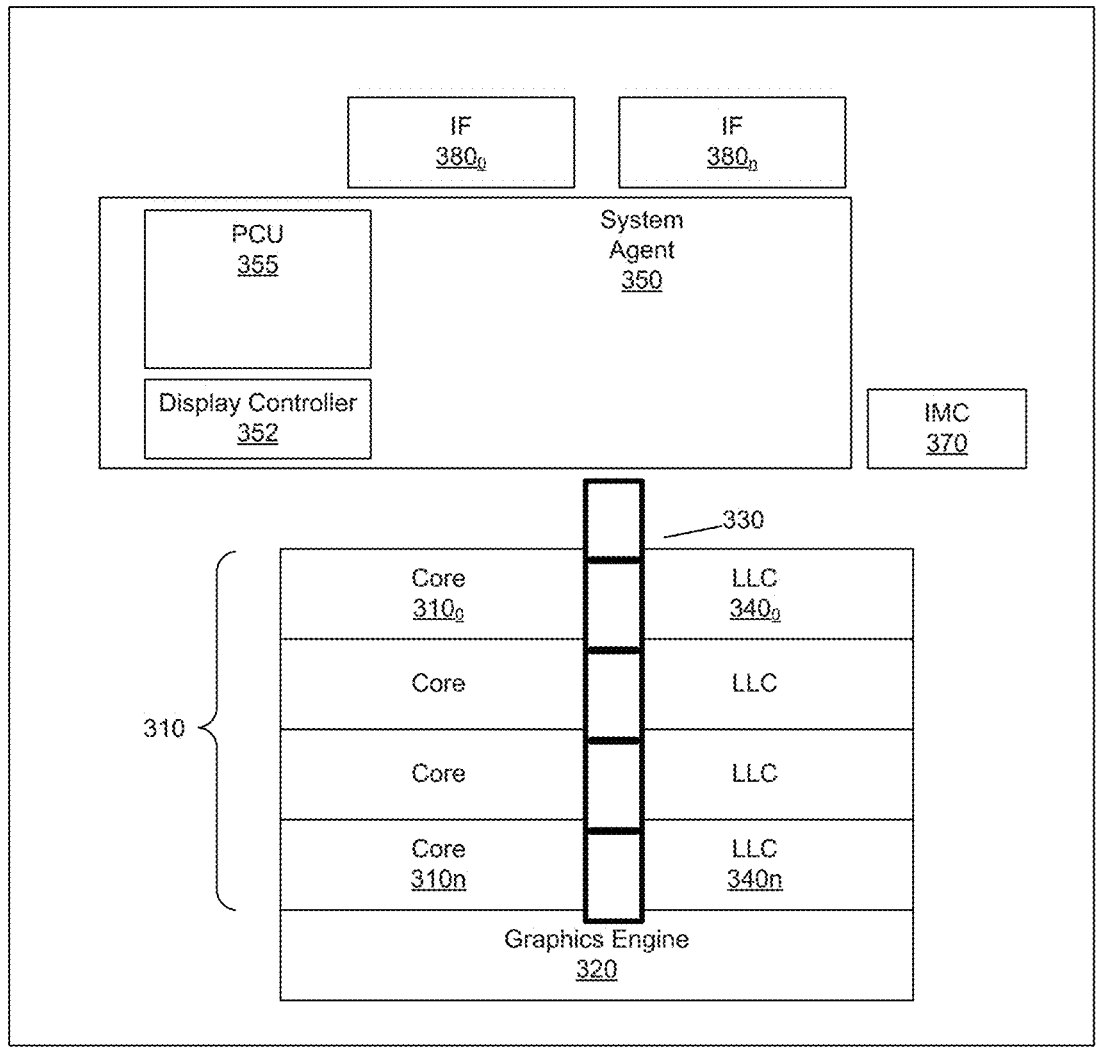
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include logic to perform the power management techniques described herein.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
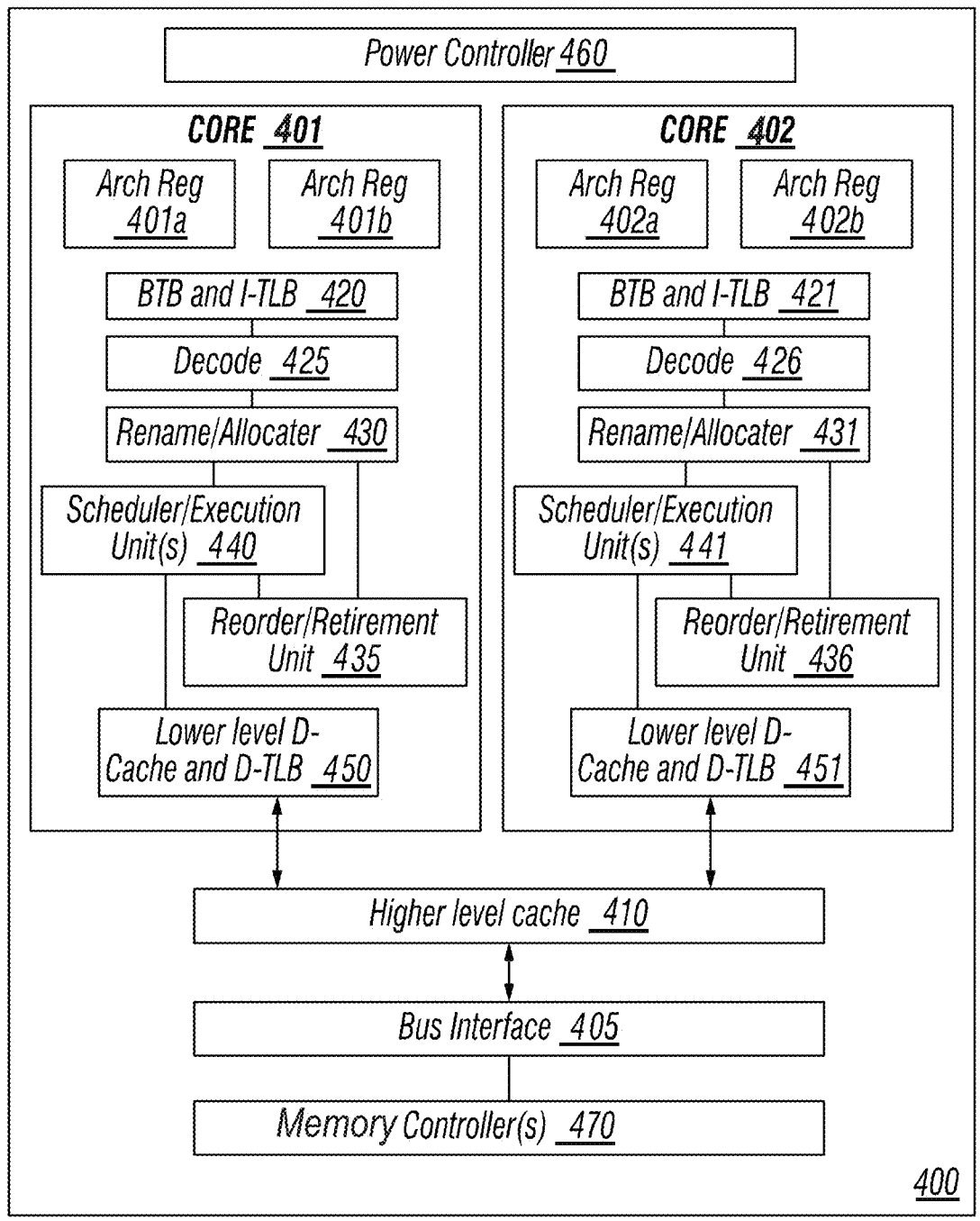
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401*b*, so individual architecture states/contexts are capable of being stored for logical processor 401*a* and logical processor 401*b*. In core 401, other smaller resources, such as instruction pointers and renaming logic in allocator and renamer block 430 may also be replicated for threads 401*a* and 401*b*. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401*a*, 401*b*, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401*a* and 401*b* are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
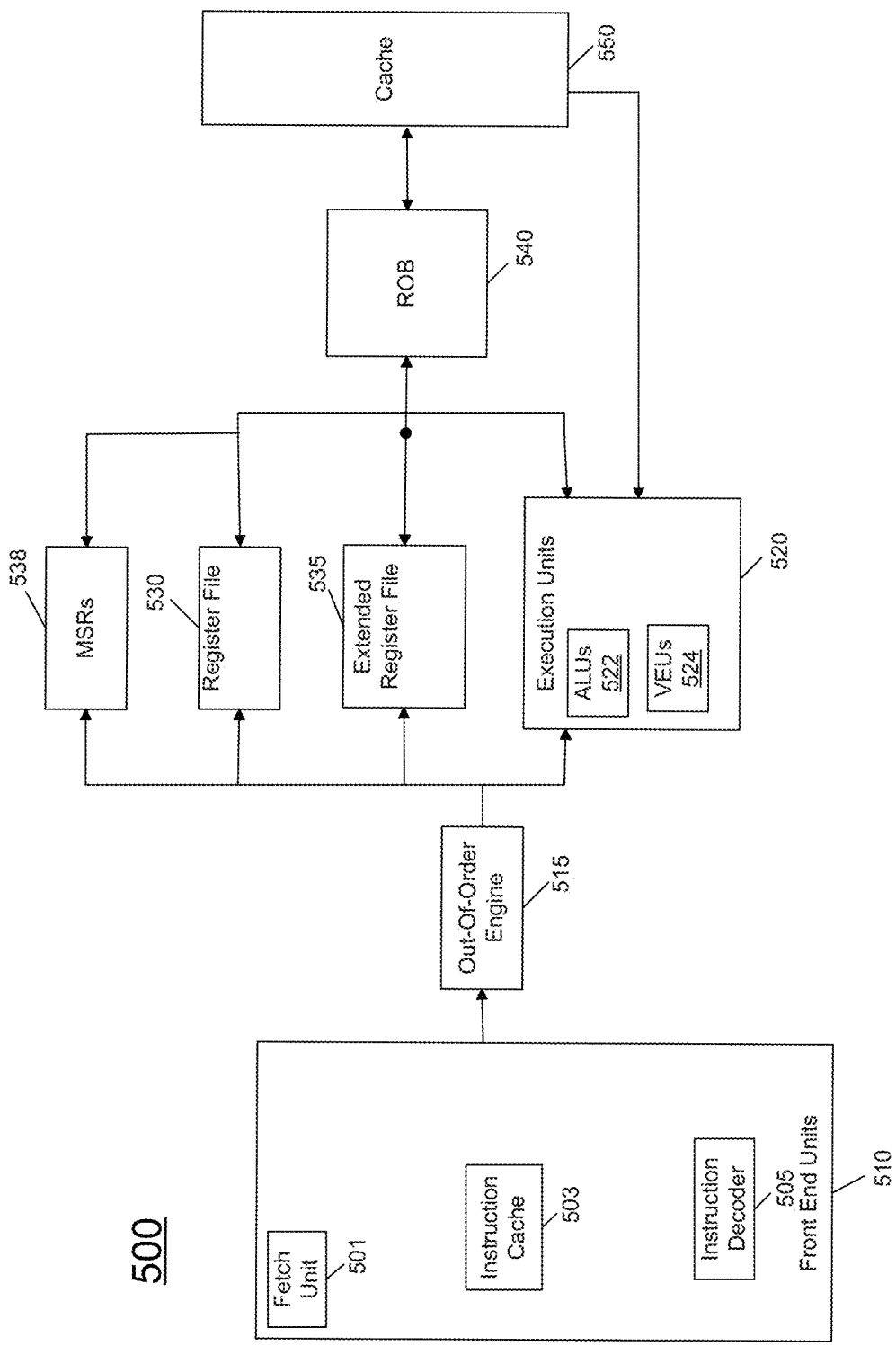
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. For purposes of configuration, control, and additional operations, a set of machine specific registers (MSRs) 538 may also be present and accessible to various logic within core 500 (and external to the core). For example, power limit information may be stored in one or more MSR and be dynamically updated as described herein.

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
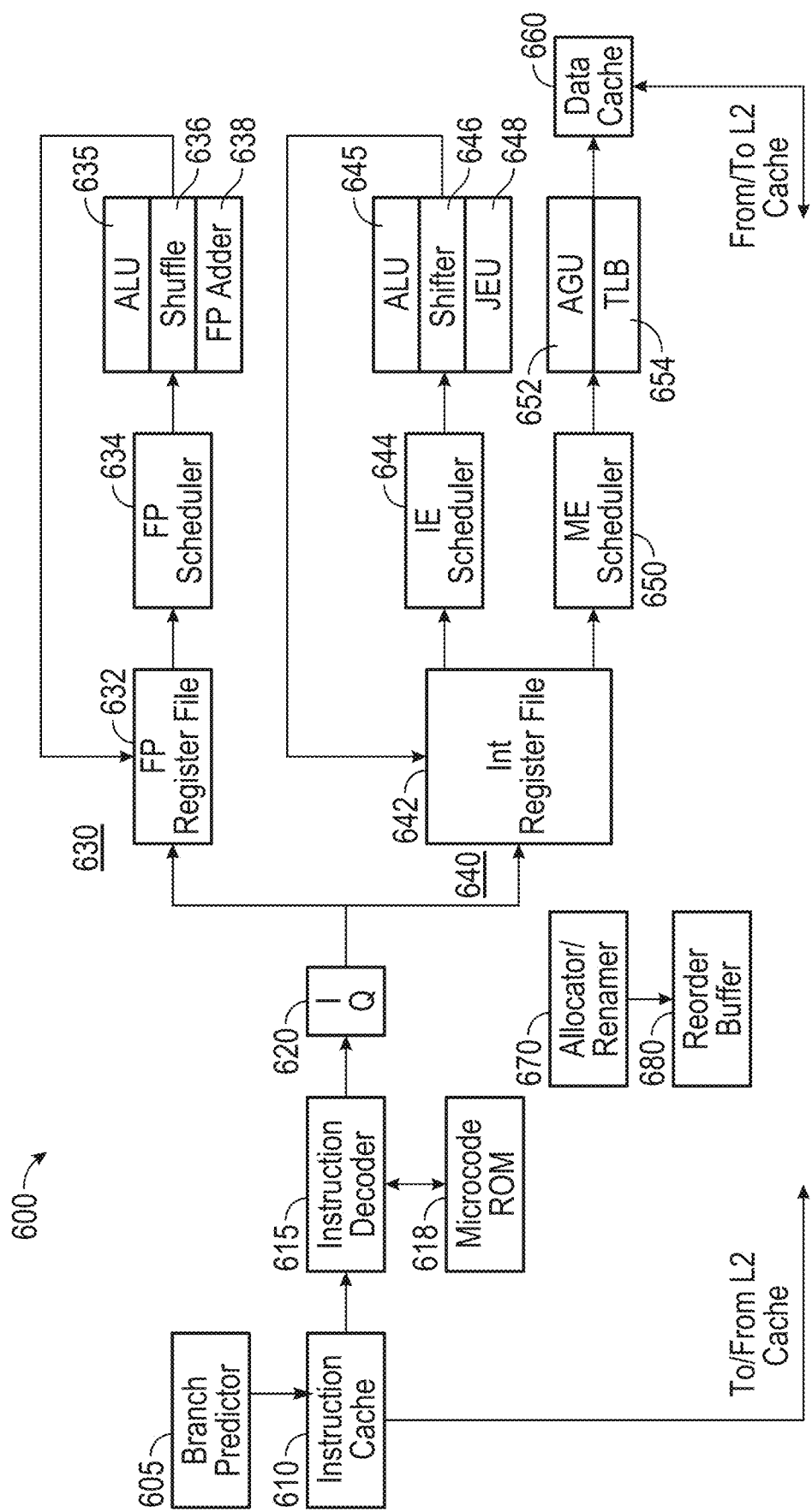
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
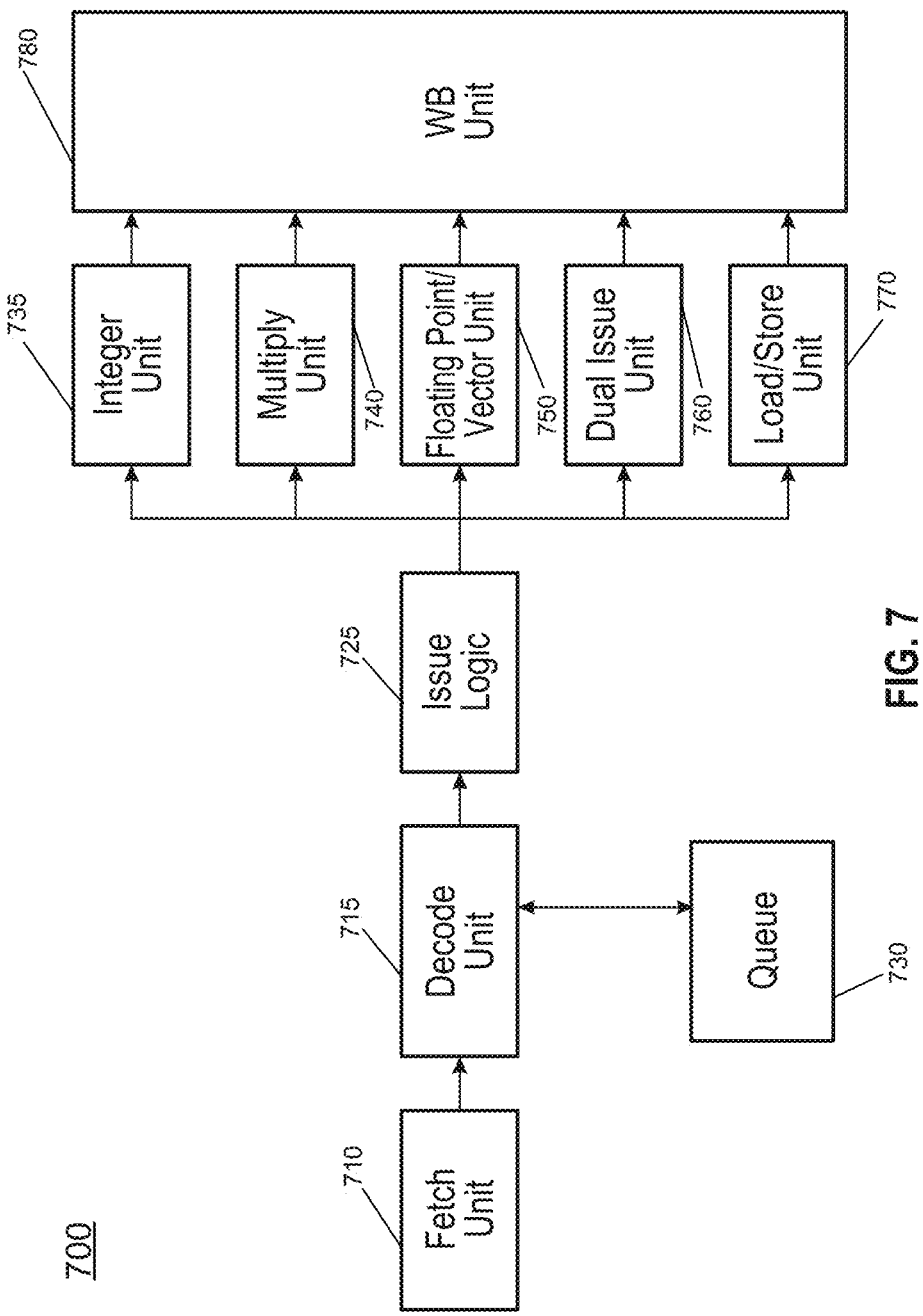
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
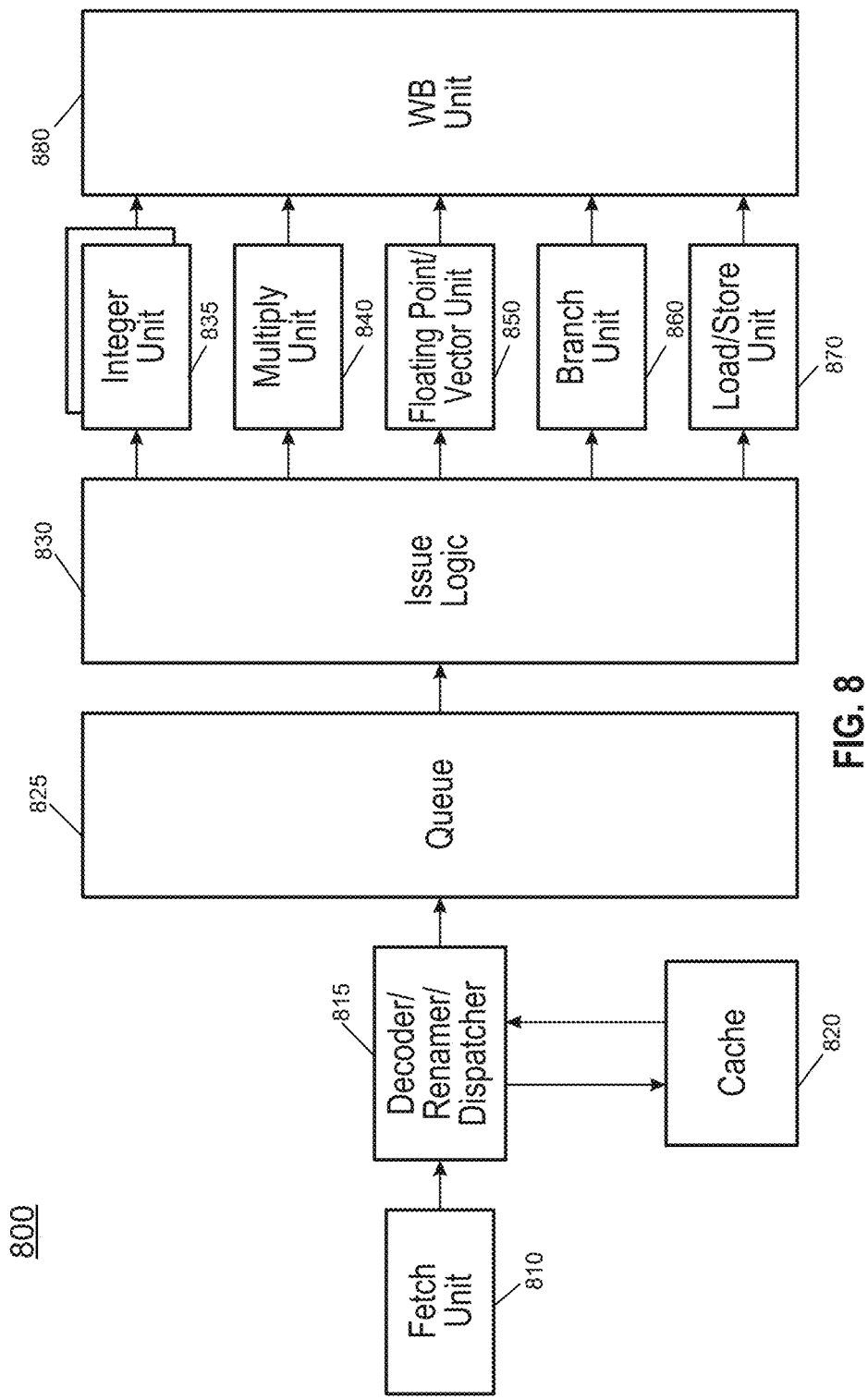
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
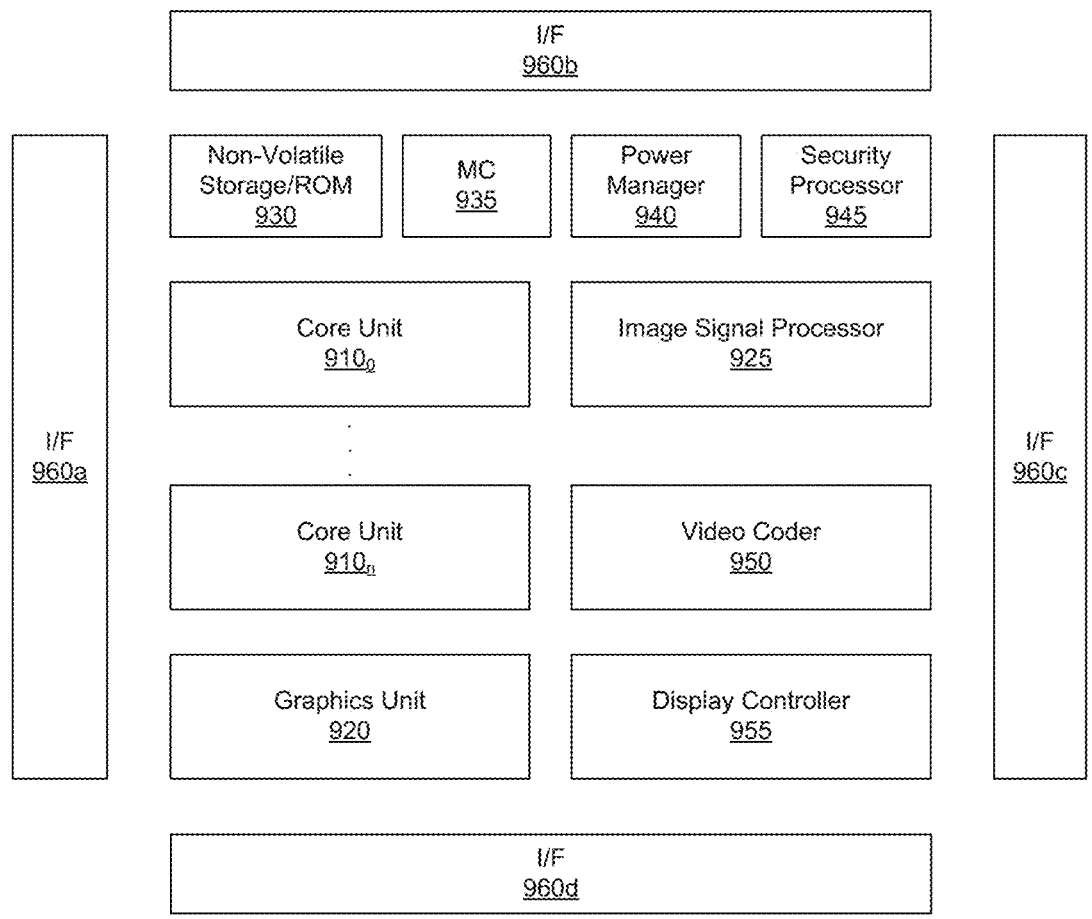
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
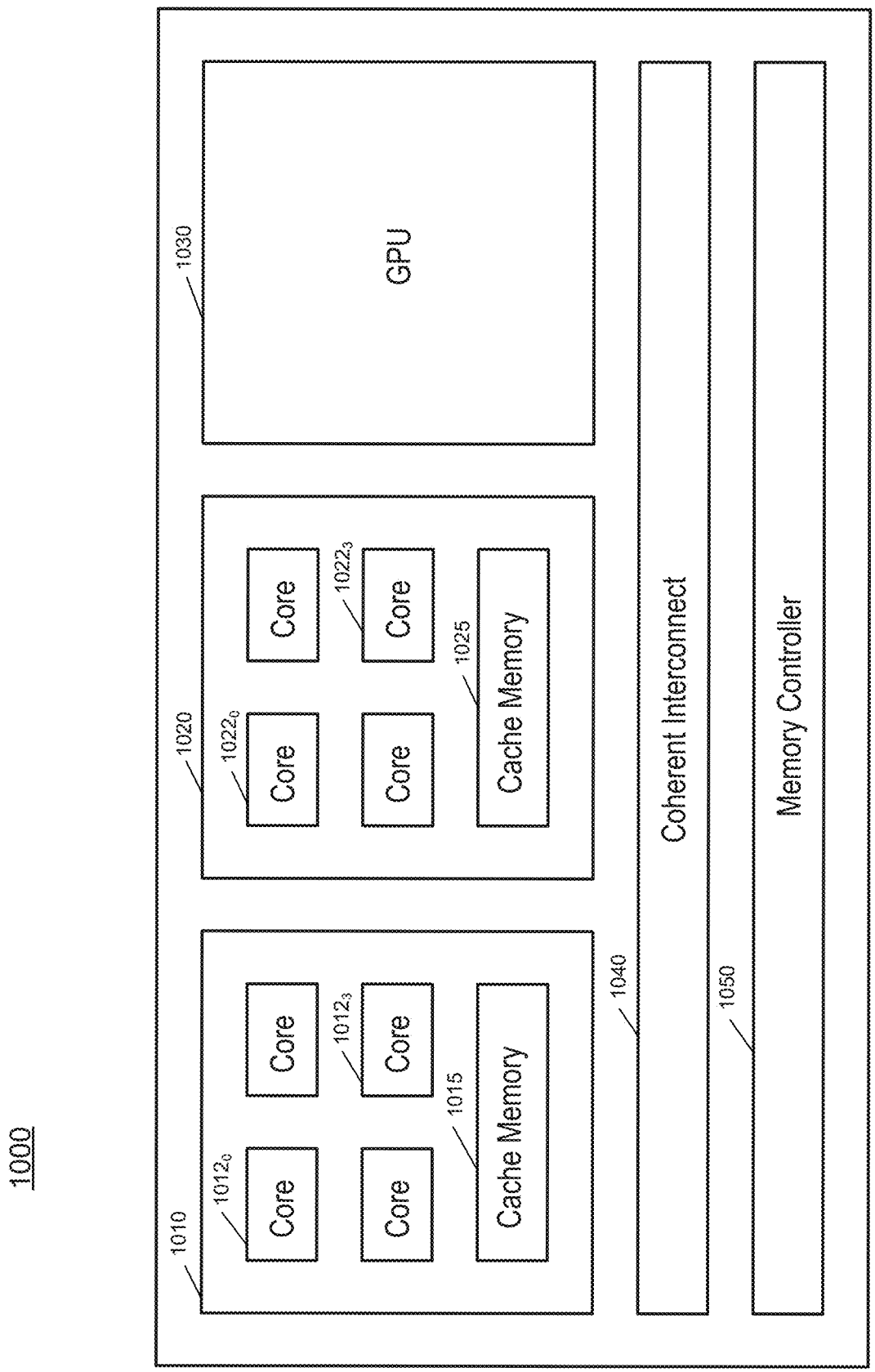
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores 1012$_0$-1012$_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores 1022$_0$-1022$_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
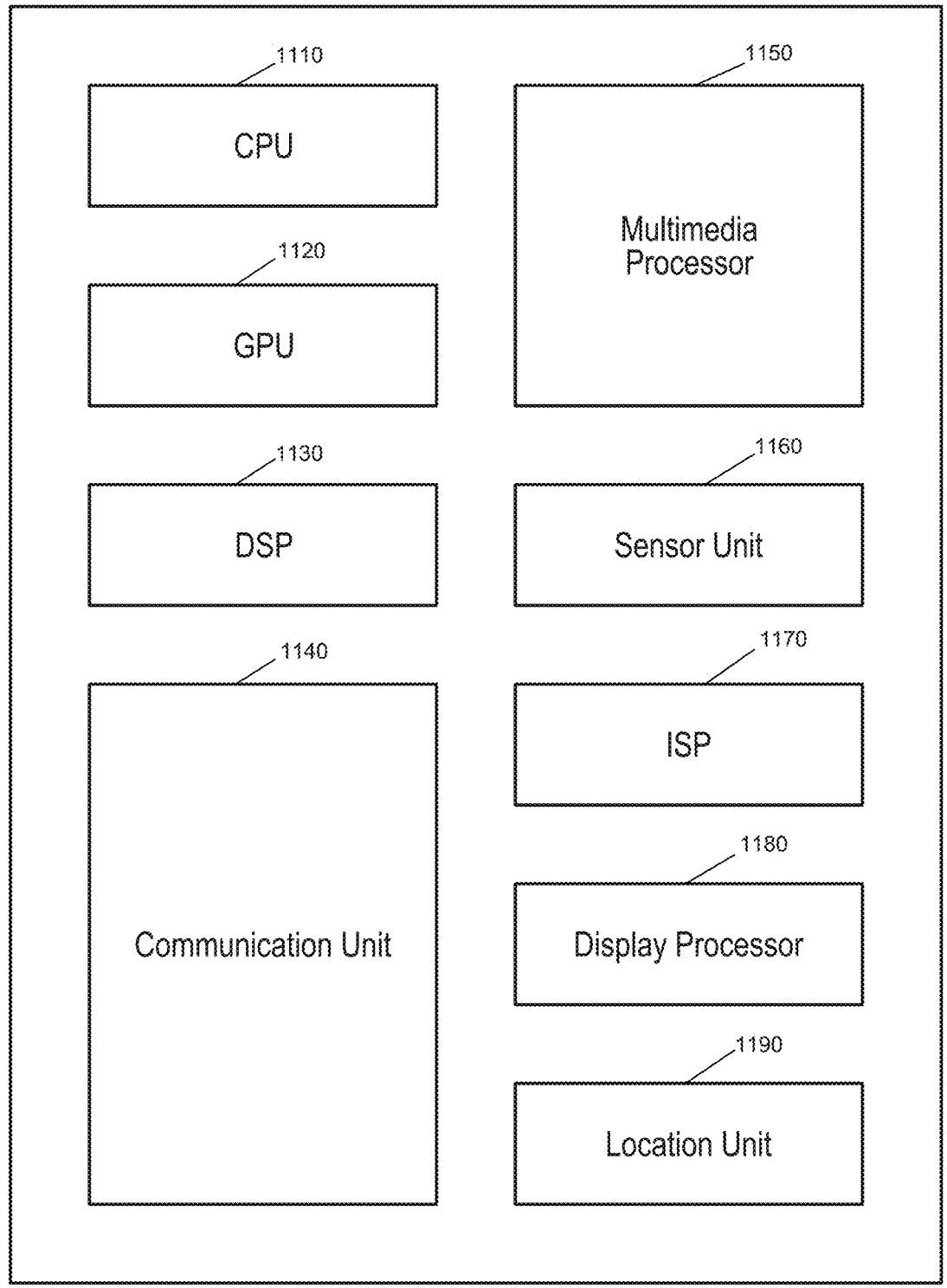
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™ IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
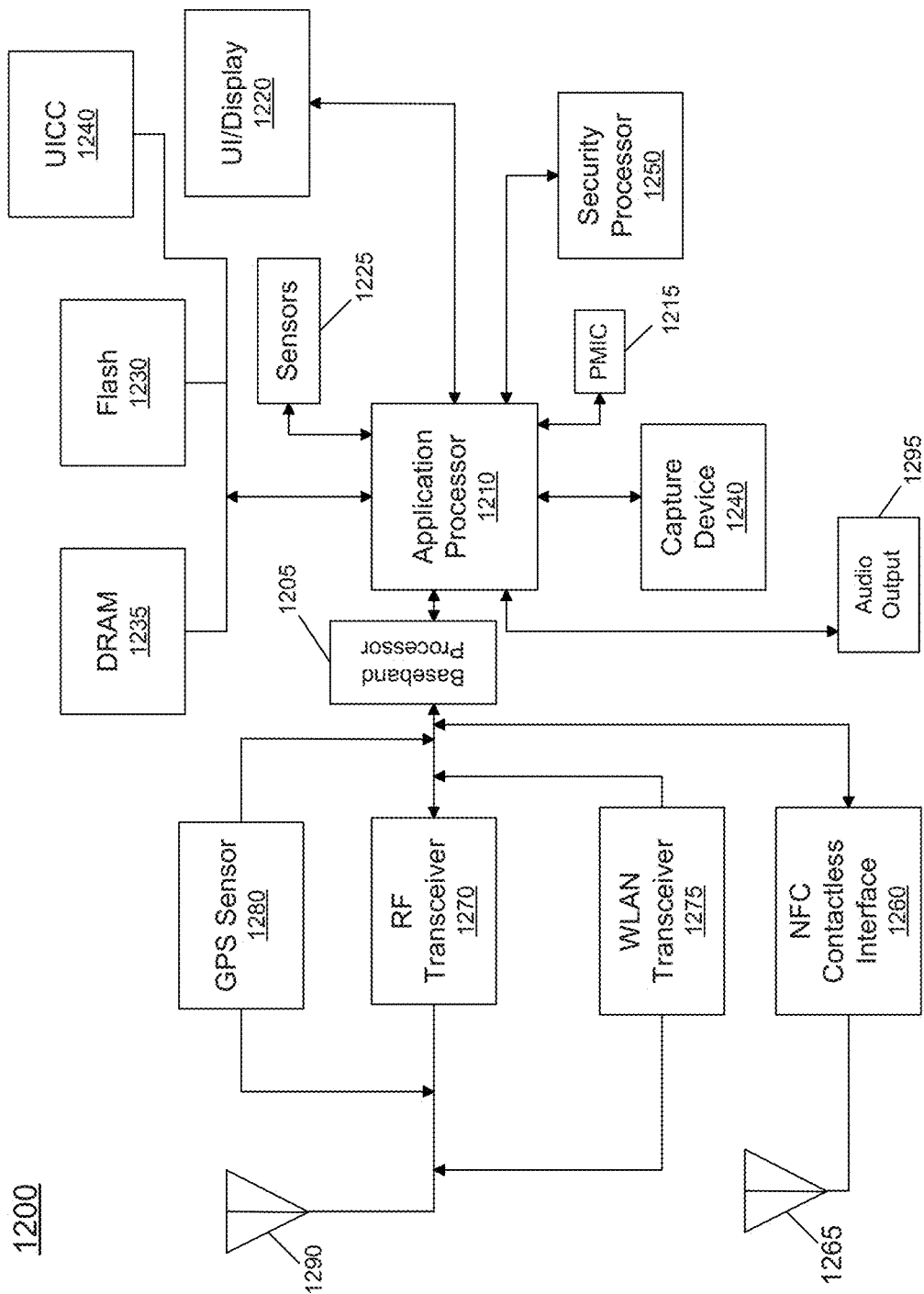
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
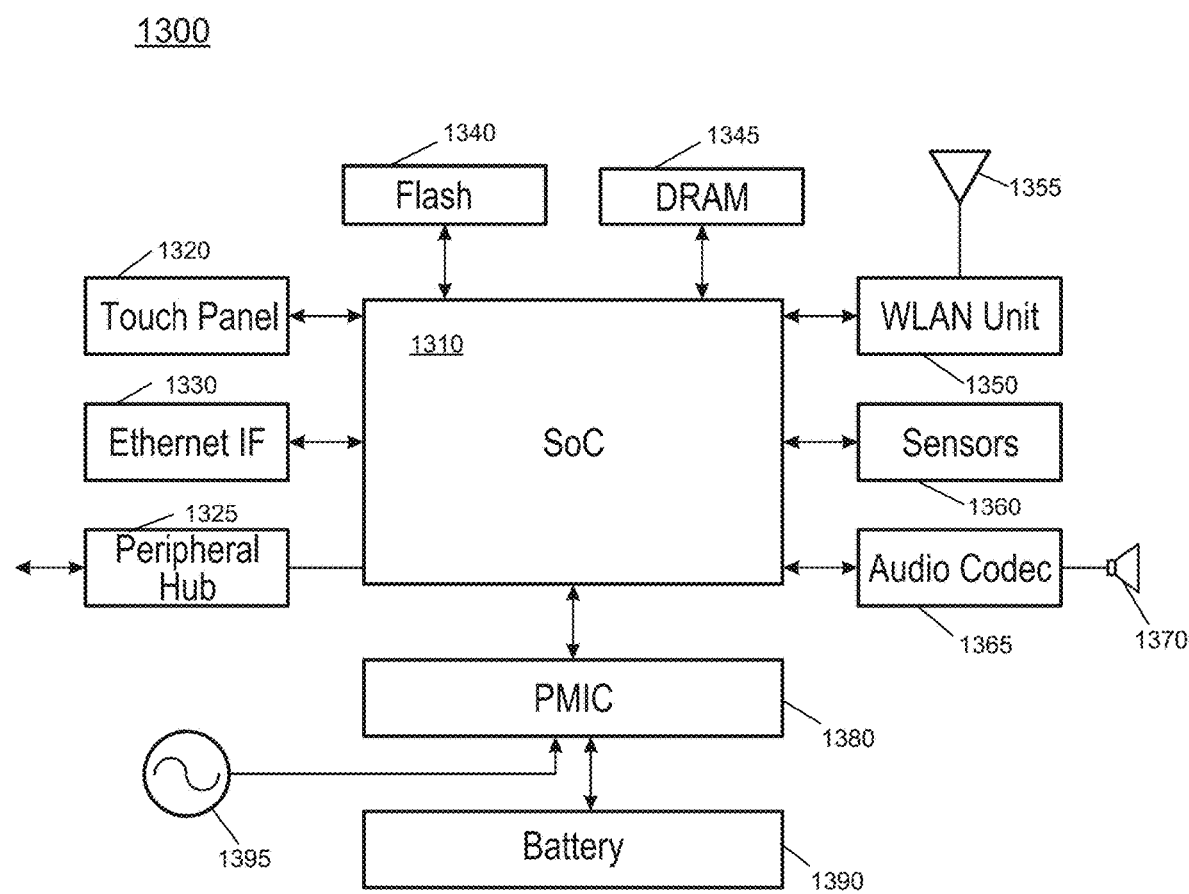
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
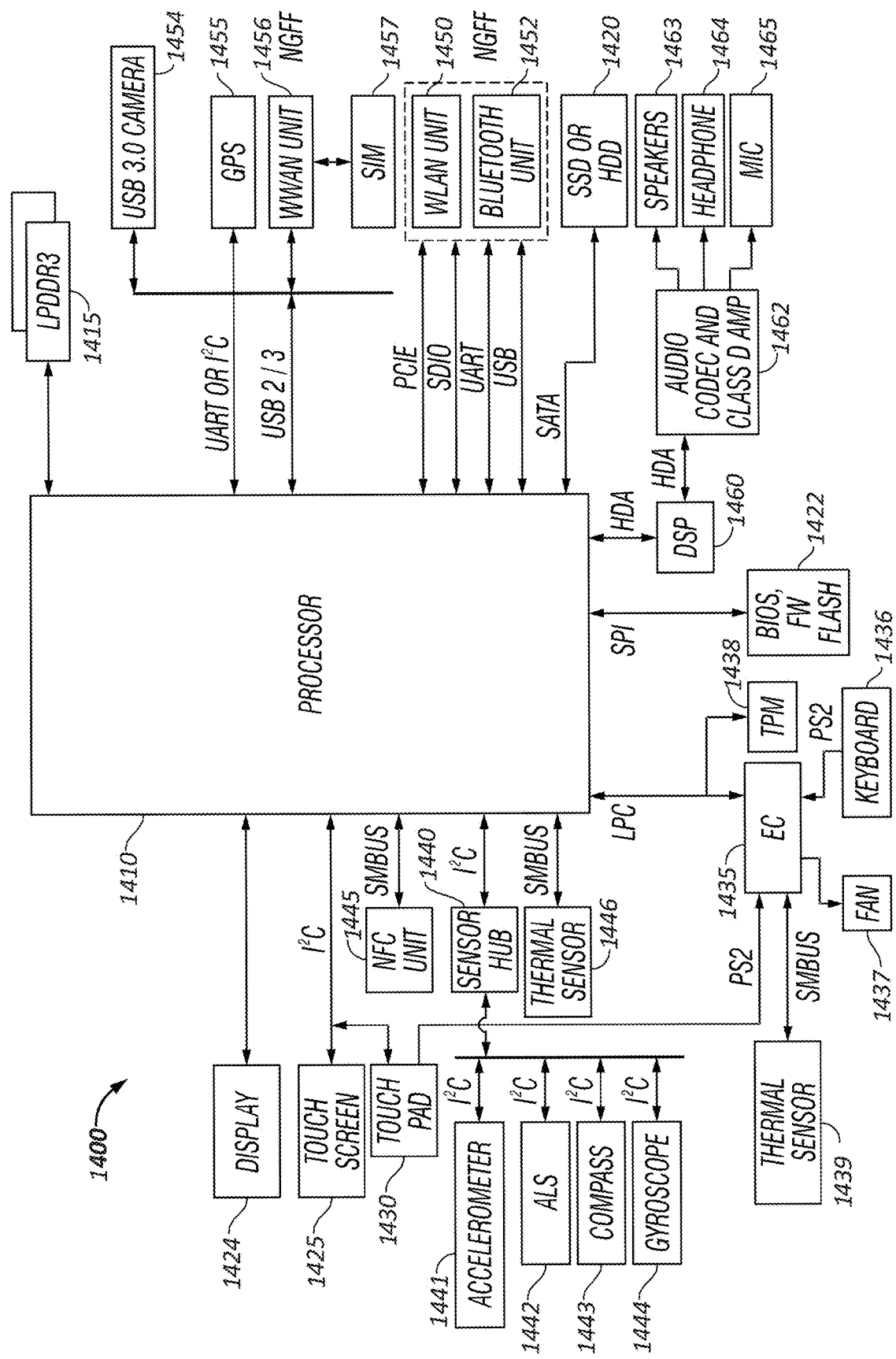
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an $I^2C$ interconnect. As further shown in FIG. 14, in addition to touch screen 1425, user input by way of touch can also occur via a touch pad 1430 which may be configured within the chassis and may also be coupled to the same $I^2C$ interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an $I^2C$ interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
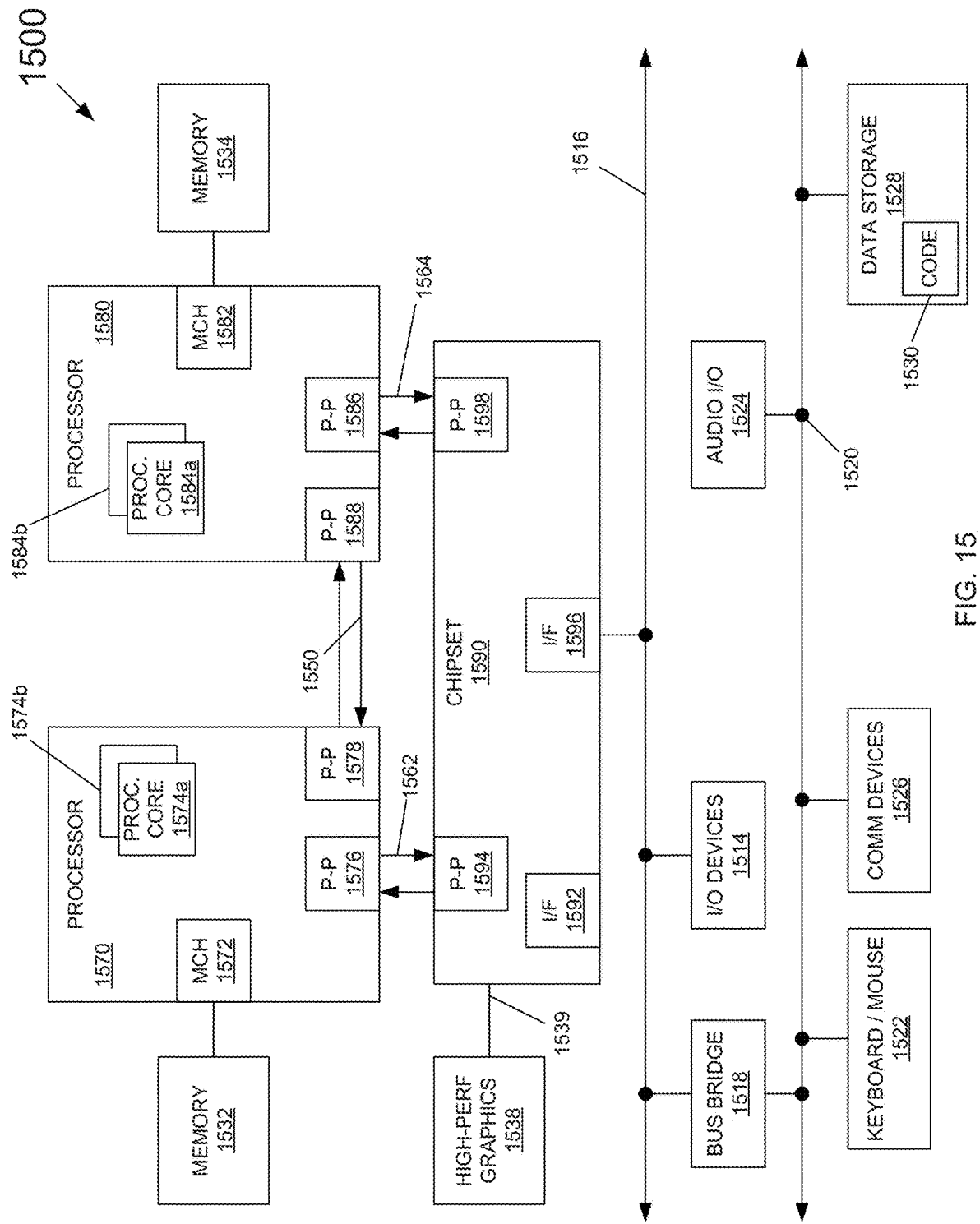
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574*a* and 1574*b* and processor cores 1584*a* and 1584*b*), although potentially many more cores may be present in the processors. Each of the processors can include a PCU or other power management logic to perform processor-based power management as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

Multi-chip processor (MCP) packages and other multi-device components such as dual inline memory modules (DIMMs) have the capability to deliver temperature information for each device (e.g., each die or chip) packaged on a common substrate. However, platform thermal management typically does not need a high degree of granularity (e.g., density) of sensor data that may be available from all temperature sensors. Instead, platform server management firmware (SMFW) may act based on distinct components within cooling zones to deliver cooling as needed. One technique to provide appropriate level of cooling may be based on a minimum thermal margin of all components within a cooling zone.

To simplify the SMFW implementation with an MCP, a mechanism may normalize and aggregate data received from the temperature sensors. For instance, the SMFW can act on a least margin of sensors in an MCP, e.g., a smallest of differences between each measured die temperatures and a determined trigger value associated with a thermal control technique such as cooling or throttling.

In an embodiment, the MCP includes a processor die and a platform controller hub (PCH) die. In another embodiment, the MCP includes a processor die, one or more dynamic random access memory (DRAM) dies, and a network interface controller (NIC) die. In another embodiment, the MCP includes a processor die and a NIC die. In other embodiments, the MCP may include other combinations of two or more dies.

In order to reduce SMFW complexity while ensuring efficiency of operation, MCPs may benefit from a mechanism to report a smallest temperature margin to each of one or more preset thresholds (e.g., difference between a measured temperature and the preset threshold). In embodiments, margins provided to the SMFW may include a smallest margin to temperature control parameter (control temperature margin) of all of the dies within the MCP, and a smallest margin to throttle parameter of all of the dies within the MCP. The smallest of the margins to temperature control may be used to determine whether to provide cooling to the MCP, while the smallest of the margins to throttle may be used to anticipate throttle activities in the MCP. Additionally, a highest temperature from all of the dies within the MCP may be reported.

The margin to temperature control parameter ($\Delta T_{control}$) for a die within an MCP may be determined by calculation of a difference between a measured temperature of the die and a control temperature Tcontrol (e.g., preset temperature at which a coolant is to be circulated in order to reduce operating temperature). For instance, the coolant may be a gas (e.g., air) that is circulated by one or more fans, or a liquid coolant to be circulated by, e.g., a pump apparatus, or another type of coolant circulation mechanism.

The margin to throttle parameter ($\Delta T_{throttle}$) may be determined by calculation of a difference between a measured temperature of one of the dies within the MCP and a throttle temperature $T_{throttle}$ (e.g., preset temperature at which the die is throttled, e.g., activity level is reduced). Throttling (e.g., reduction) of activity within the die may be effected by reduction of clock frequency of logic within the die, reduction of operating voltage of the logic, reduction of instruction throughput of execution logic, reduction of duty cycle of one or more logics within the die, etc., or a combination of any of the aforementioned throttling techniques or other throttling techniques.

Figure 16:
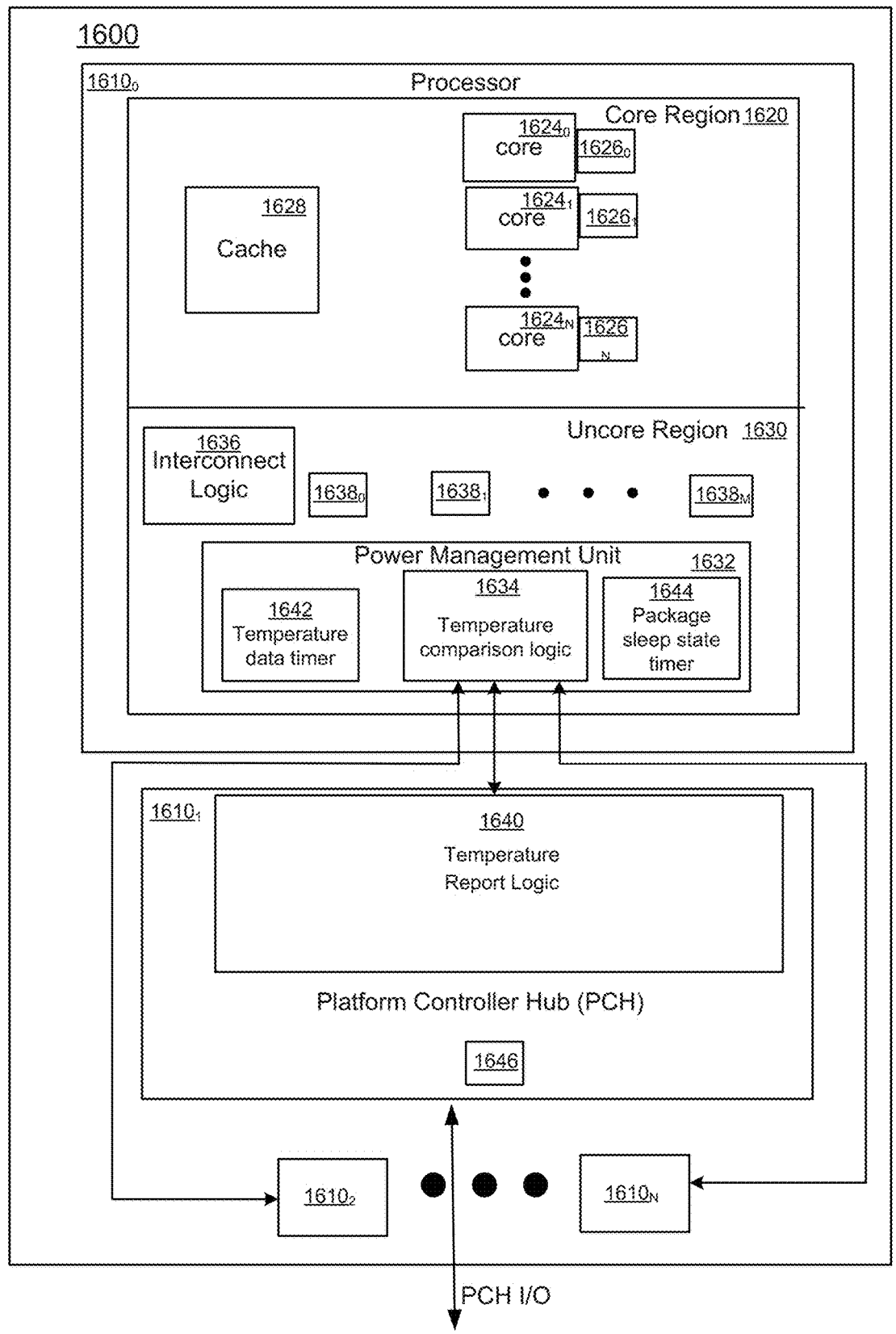
FIG. 16 is a block diagram of a multi-chip package, according to embodiments of the present invention.

FIG. 16 is a block diagram of a multi-chip package 1600, according to embodiments of the present invention. The MCP 1600 may include a plurality of dies 1610$_0$-1610$_N$, including a processor die 1610$_0$ and a platform controller hub (PCH) die 1610$_1$.

The processor die 1610$_0$ may include a core region 1620 that may include a plurality of cores 1624$_0$-1624$_N$, a plurality of temperature sensors 1626$_0$-1626$_N$, and a cache memory 1628. The processor die 1610$_0$ may also include an uncore region 1630 that may include a power management unit (PMU) 1632, interconnect logic 1636, and one or more uncore agents each with one or more temperature sensors 1638. The PMU 1632 may include temperature comparison logic 1634, a temperature data timer 1642, and a package sleep state timer 1644. The PMU 1632 may include hardware (e.g., controller), software, firmware, or a combination thereof. For example, the PMU 1632 may include a hardware controller to perform calculations, e.g., determination of difference between a temperature value received and a temperature control parameter, determination of a largest of a plurality of values, etc.

The PCH die 1610$_1$ may include a temperature sensor 1646, and temperature report logic 1640. Additional dies 1610$_2$-1610$_N$ may include one or more of dynamic random access memory (DRAM), network interface controller (NIC) die, and/or other dies. Each of the other dies 1610$_2$-1610$_N$ may include a temperature sensor and temperature report logic (not shown).

In operation, the temperature report logic 1640 may report, to the PMU 1632, temperature data associated with a temperature of the PCH die 1610$_1$. The temperature data may be generated by temperature sensor 1646. (Alternatively, the temperature report logic 1640 may receive raw temperature data from the temperature sensor 1646 and may convert the received raw temperature data into temperature data prior to reporting to the PMU 1632). The temperature data may be received by the temperature comparison logic 1634 from the temperature report logic 1640 on a periodic basis according to a period to be determined by the temperature data timer 1642. The temperature data timer 1642 may periodically count down for a preset time period ($\Delta t$), and upon completion of the time period $\Delta t$, temperature data received by the temperature report logic 1640 from the temperature sensor 1646 may be received by PMU 1632 and may be input to the temperature comparison logic 1634. In some embodiments, the temperature data may be measured substantially instantaneously and the instantaneous temperature data may be transmitted from the PCH 1610$_1$ to the PMU 1632 upon expiration of $\Delta t$. In other embodiments, the temperature data may be measured a plurality of times during the time period $\Delta t$. The measured temperature data may be averaged and an average of the temperature data measured over $\Delta t$ may be provided to the temperature comparison logic 1634.

Based on the temperature data received from each die, the temperature comparison logic 1634 may calculate a highest temperature ($T_{highest}$) within the MCP. The temperature comparison logic 1634 may also calculate one or both of $\Delta T_{throttle}$ and $\Delta T_{control}$ for each die. For example, $\Delta T_{throttle\,j}$ for a $j^{th}$ die of dies of a $K^{th}$ type may be determined by a calculation of a difference of the measured temperature of the die (determined based on the temperature data received) and determined throttle temperature $T_{throttleK}$ (e.g., throttle temperature for a die type K, where K is an integer corresponding to the die type). From the $\Delta T_{throttle\,j}$ values calculated, a smallest value for a particular K may be determined ("$\Delta T_{throttle}$"). The temperature comparison logic 1634 may select a smallest value of $\Delta T_{throttleK}$ ("$\Delta T_{throttle}$") from the calculated values (for all values of K) of $\Delta T_{throttleK}$.

In similar fashion, the temperature comparison logic 1634 may determine $\Delta T_{control\,j}$ for a jth die (j=1, 2, . . . ) of dies of a $K^{th}$ type, as a difference of the measured temperature of the die and a determined control temperature $T_{controlK}$ (e.g., control temperature for a die type K, where K is an integer corresponding to the die type). The temperature comparison logic 1634 may determine, or each value K, a smallest of the $\Delta T_{control\,j}$ of dies of the $K^{th}$ type ("$\Delta T_{control\,K}$"). From the various $\Delta T_{control\ K}$ for all values of K, a smallest throttle margin $\Delta T_{control}$ may be selected. The thermal report may include one or more of $T_{highest}$, $\Delta T_{throttle}$, and $\Delta T_{control}$. The thermal report may be stored, e.g., in the PMU 1632, and may be provided upon request. For example, the report may be provided to the software management firmware (SMFW, not shown), which may be external to the MCP 1600.

Based on the thermal report, the SMFW may determine a course of action to reduce an operating temperature of the MCP 1600. For example, if the $\Delta T_{control}$ is interpreted by the SMFW as an indication that the MCP 1600 is operating at an excessive temperature, the SMFW may effect cooling of the MCP 1600, e.g., via circulation of a coolant such as air, or another coolant, e.g., a liquid coolant. For example, if the coolant is air, then cooling may be effected via engagement of one or more fans to circulate the air. If the coolant is a liquid, cooling may be effected via engagement of one or more liquid pumps to circulate the coolant. If, from a subsequent value of $\Delta T_{control}$, it is determined that the MCP 1600 is not operating at an excessive temperature, the coolant circulation mechanism may be reduced, disengaged or shut down.

If from the $\Delta T_{throttle}$ it is determined that one of the dies 1610$_i$ is operating at a temperature that exceeds the $T_{throttleK}$ of the die 1610$_i$, throttling of one or more dies of the MCP 1600 may be indicated. If, from a subsequent value of $\Delta T_{throttle}$, it is determined that no die temperature exceeds its corresponding control temperature $T_{throttleK}$, throttling may be stopped.

Figure 17:
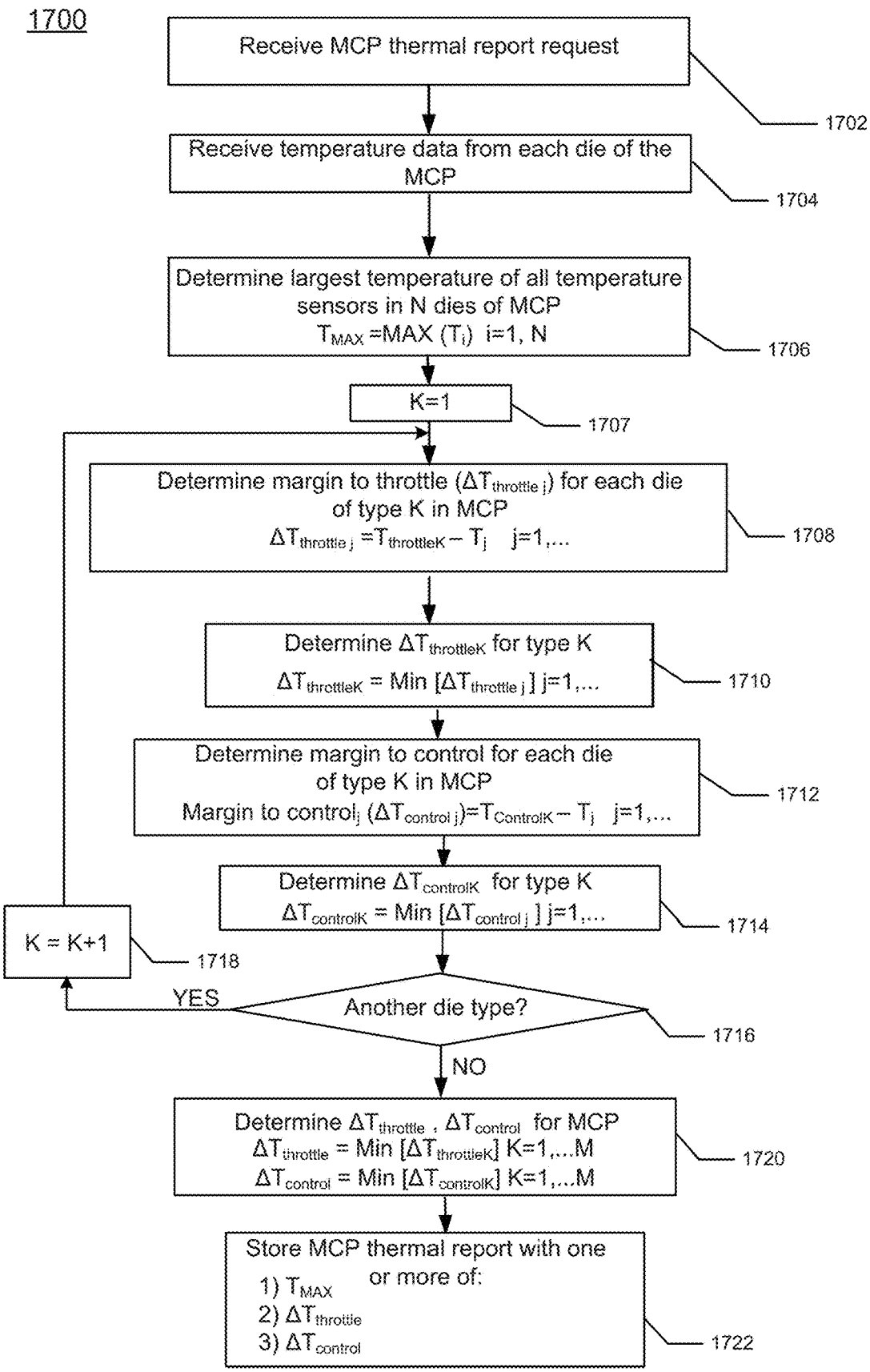
FIG. 17 is a flow diagram of a method, according to an embodiment of the present invention.

FIG. 17 is a flow diagram of a method 1700, according to an embodiment of the present invention. At block 1702, a temperature report request is received, e.g., at a power management unit (PMU) of an MCP. Continuing to block 1704, temperature data is received by the PMU from each die of the MCP. Advancing to block 1706, a largest temperature $T_{max}$ of all N dies of the MCP may be determined.

Thermal margins for temperatures collected on different types of dies may be handled differently because each die of type K may have a $T_{throttleK}$ and/or $T_{controlK}$ specific to the die type K. Continuing to block 1707, K is initialized to a value of 1. Moving to block 1708, margin to throttle ($\Delta T_{throttle\ j}$) may be determined for each die of a particular type K (e.g., K=1, 2, 3, etc.) in the MCP. (In some embodiments, the throttle temperature $T_{throttleK}$ is the same for all dies. In other embodiments, the throttle temperature $T_{throttleK}$ may vary for each die type K.) Proceeding to block 1710, a minimum $\Delta T_{throttleK}$ of the dies of type K may be determined from the values of $\Delta T_{throttle\ j}$.

Continuing to block 1712, margin to control $\Delta T_{control\ j}$ may be determined for each die of type K. (In some embodiments, control temperature $T_{controlK}$ is the same for all dies. In other embodiments, control temperature $T_{controlK}$ may depend upon the die type K.) Advancing to block 1714, a minimum $\Delta T_{control\ j}$ for dies of type K ($=\Delta T_{controlK}$) may be determined from the values of $\Delta T_{control\ j}$. Moving to decision diamond 1716, if another type of die is present in the MCP, proceeding to block 1718, K is incremented and returning to block 1708, the minimum margins, (e.g., $\Delta T_{throttleK}$ and $\Delta T_{controlK}$) are determined for another die type. Proceeding to block 1720, $\Delta T_{throttle}$ and $\Delta T_{controlK}$) are determined as the minimum of the respective values of $\Delta T_{throttleK}$ and $\Delta T_{controlK}$ for all values of K. Advancing to block 1722, an MCP thermal report may be stored responsive to the request, and may include one or more of $T_{max}$, $\Delta T_{throttle}$, and $\Delta T_{control}$. The report may be provided upon request, e.g., to an external requester such as a platform that includes the MCP, SMFW, or to another requester.

Figure 18:
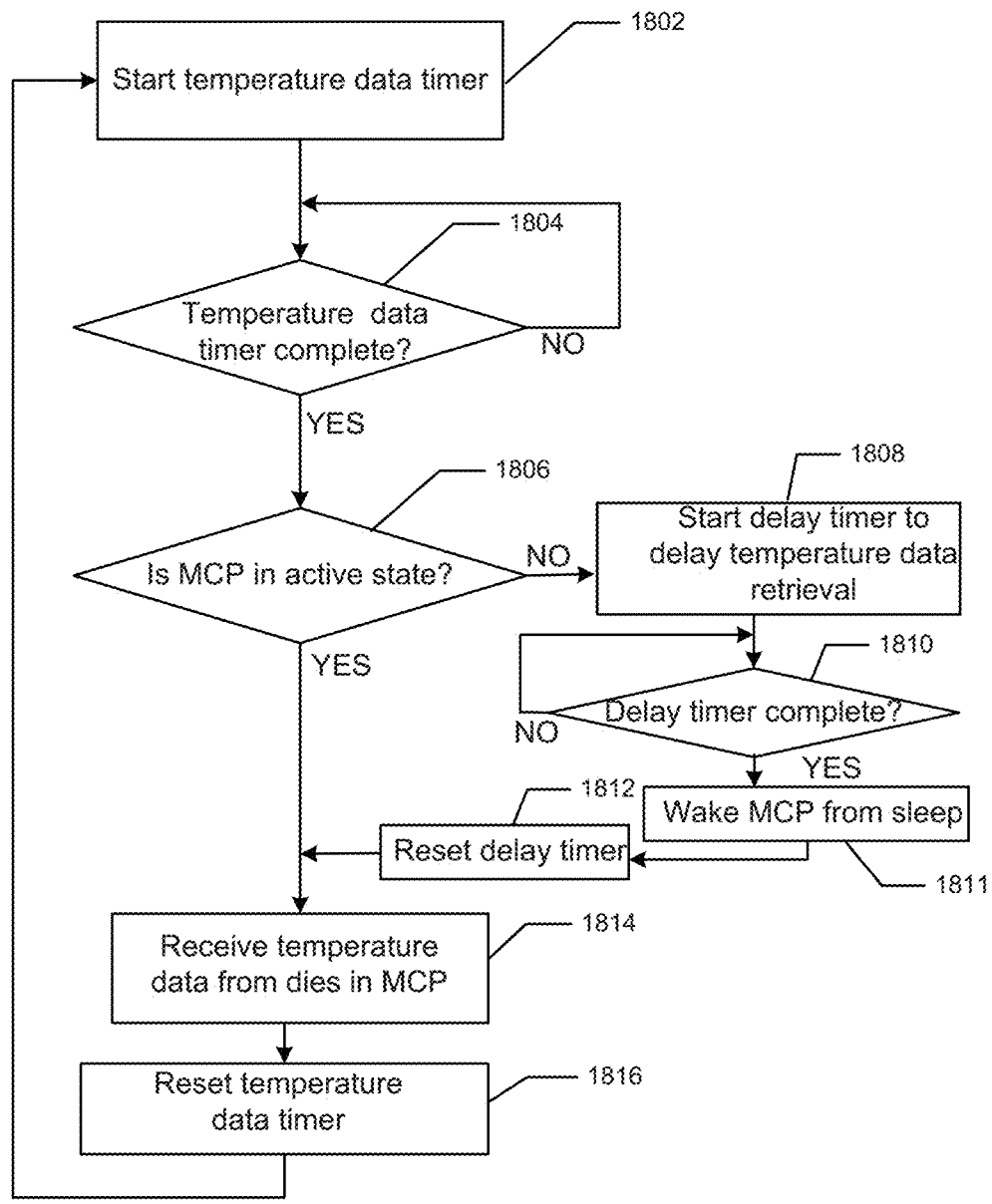
FIG. 18 is a flow diagram of a method, according to another embodiment of the present invention.

FIG. 18 is a flow diagram of a method 1800, according to another embodiment of the present invention. At block 1802, a temperature timer (e.g., within a power management unit (PMU) of an MCP) may be started that is to time a first period, e.g., a timed interval that is to occur prior to receipt of temperature data from one or more dies of the MCP to the PMU. Continuing to decision diamond 1804, if the temperature timer has not completed its timing of the first period, the temperature timer may continue to run until the first period is completed. Proceeding to decision diamond 1806, if the MCP is an active state (e.g., the MCP is in Package C0 state), continuing to block 1814 temperature data may be received by the PMU from the dies of the MCP.

If, at decision diamond 1806, the MCP is in a sleep state (e.g., in a sleep state such as a Package C3 state, a Package C6 state, etc.), proceeding to block 1808 a delay timer may be started to delay receipt of the temperature data by the PMU, which may allow the MCP to remain in sleep mode for an additional delay time that may result in an energy saving, as compared with an earlier "wake-up" (e.g., in order to collect the temperature data) that would be requested by the PMU upon expiration of the first period. Continuing to decision diamond 1810, the delay timer may run to completion of the delay period. Upon completion of the delay period, advancing to block 1811, the MCP may be awakened from its sleep state in order to collect the temperature data from the dies of the MCP. Moving to block 1812, the delay timer may be reset. Proceeding to block 1814, the temperature data may be read from the dies of the MCP, and proceeding to block 1816, the temperature data timer may be reset. Continuing to block 1802, the temperature data timer may again be started to time another first period between temperature measurements. Thus, when the MCP is in a sleep state, timing of data acquisition instances that includes the delay timer can provide for a longer "down time," (e.g., a second period that includes the first period and the delay period) as compared with the first period. Implementation of the second period when the MCP is in a sleep mode may result in increased power saving due to a prolonged time interval in which the MCP is in the sleep state.

Other embodiments are described below.

A first embodiment is a processor to include at least one core and power management logic. The power management logic is to receive temperature data from a plurality of dies within a package that includes the processor, determine a smallest temperature control margin of a plurality of temperature control margins where each temperature control margin is to be determined based on a respective thermal control temperature associated with the die and based on respective temperature data associated with the die, generate a thermal report that is to include the smallest temperature control margin, and store the thermal report.

A $2^{nd}$ embodiment includes elements of the $1^{st}$ embodiment. Additionally, the power management logic is further to determine the corresponding temperature control margin for each die of the plurality of dies, where each temperature control margin is to be determined based on a difference between the respective thermal control temperature associated with the die and the respective temperature data associated with the die.

A $3^{rd}$ embodiment includes elements of the $2^{nd}$ embodiment. Additionally, the power management logic is to select the smallest thermal control margin from the plurality of temperature control margins.

A $4^{th}$ embodiment includes elements of the $2^{nd}$ embodiment. Additionally, the power management logic is to determine whether the package is in an active state, and responsive to determination that the package is in the active state, the power management logic is to receive corresponding temperature data from each die of the package periodically according to a first time period.

A $5^{th}$ embodiment includes elements of the $4^{th}$ embodiment. Additionally, responsive to a determination by the power management logic that the package is in a sleep state, the power management logic is to wake the package to the active state after a second time period has elapsed, where the second period is longer than the first time period, and upon waking the package to the active state the power management logic is to receive the corresponding temperature data from each die of the plurality of dies.

A $6^{th}$ embodiment includes elements of the $1^{st}$ embodiment, where the power management logic is to provide the thermal report responsive to a request.

A $7^{th}$ embodiment includes elements of the $1^{st}$ embodiment, where the power management logic is further to determine each of a plurality of throttle margins, and where each throttle margin is determined based on a throttle temperature and on the corresponding temperature data received from a corresponding die of the plurality of dies.

An $8^{th}$ embodiment includes elements of the $7^{th}$ embodiment. Additionally, the power management logic is further to determine a smallest throttle margin of the plurality of throttle margins and to include the smallest throttle margin in the thermal report.

A $9^{th}$ embodiment includes elements of any one of embodiments 1-9, where the power management logic is further to determine a highest temperature of the plurality of dies based on the temperature data received, and to include the highest temperature of the plurality of dies in the thermal report.

A $10^{th}$ embodiment is a multi-chip package (MCP) that is to include a plurality of dies, each die to provide corresponding temperature data associated with a die temperature of the die. The MCP is further to include power management logic that is to receive a plurality of temperature data including the corresponding temperature data from each die, to determine a plurality of temperature control margins, each temperature control margin based on corresponding temperature data of the die and on a respective thermal control temperature of the die, to determine a smallest temperature control margin of the temperature control margins, and to store a report that includes the smallest temperature control margin.

An $11^{th}$ embodiment includes elements of the $10^{th}$ embodiment. Additionally, the power management logic is to determine a largest die temperature from plurality of temperature data, and to include in the report, information associated with the largest die temperature of the dies.

A $12^{th}$ embodiment includes elements of the $10^{th}$ embodiment, where the processor is further to determine a throttle margin for each die, the throttle margin to be determined based on a comparison of a respective throttle temperature of the die to a die temperature based on the temperature data received from the die.

A $13^{th}$ embodiment includes elements of the $12^{th}$ embodiment, and the processor is further to determine a smallest throttle margin from the plurality of throttle margins, and to include the smallest throttle margin in the report.

A $14^{th}$ embodiment includes elements of any one of embodiments 10-13. Additionally, the power management logic is to collect corresponding temperature data from each die periodically according to a first time period, responsive the MCP being in an active state.

A $15^{th}$ embodiment includes elements of the $14^{th}$ embodiment. Further, responsive to the MCP being in a sleep state the power management logic is to wake the MCP after a second time period that is longer than the first time period and to collect, from each die, the corresponding temperature data.

A $16^{th}$ embodiment is a machine-readable medium having stored thereon data, which if used by at least one machine, causes the at least one machine to fabricate at least one integrated circuit to perform a method to include receiving, at power management logic of a multi-chip package (MCP), corresponding temperature data from each die of a plurality of dies of the multi-chip package (MCP), determining, by the power management logic, a corresponding control temperature margin for each die based on the corresponding temperature data and on a respective control temperature of the die, determining, by the power management logic, a smallest control temperature margin from the control temperature margins, and storing, by the power management logic, a thermal report that includes the smallest control temperature margin.

A $17^{th}$ embodiment includes elements of the $16^{th}$ embodiment. Additionally, the method further includes determining, by the power management logic, a smallest throttle margin of the dies based on a comparison of the die temperatures to a throttle temperature that is associated with reduction of activity of the MCP, and including the smallest throttle margin in the thermal report.

An $18^{th}$ embodiment includes elements of any one of embodiments 16-17. Additionally, the MCP is in one of an active state and a sleep state and the method further includes determining, by the power management logic, whether the MCP is in the active state.

A $19^{th}$ embodiment includes elements of the $18^{th}$ embodiment, and the method further includes responsive to determining that the MCP is in the active state, receiving by the power management logic the corresponding temperature data periodically from each die according to a first time period.

A $20^{th}$ embodiment includes elements of the $19^{th}$ embodiment, and the method further includes responsive to determining that the MCP is in the sleep state, causing the MCP to change to the active state after a second time period has elapsed that is greater than the first period, and when the MCP is in the active state, receiving the corresponding temperature data.

A $21^{th}$ embodiment is a method that is to include receiving, at power management logic of a multi-chip package (MCP), corresponding temperature data from each die of a plurality of dies of the multi-chip package (MCP), determining, by the power management logic, a corresponding control temperature margin for each die based on the corresponding temperature data and on a respective control temperature of the die, determining, by the power management logic, a smallest control temperature margin from the control temperature margins, and storing, by the power management logic, a thermal report that includes the smallest control temperature margin.

A $22^{nd}$ embodiment is to include elements of the $21^{st}$ embodiment, and further includes determining, by the power management logic, a smallest throttle margin of the dies based on a comparison of the die temperatures to a throttle temperature that is associated with reduction of activity of the MCP, and including the smallest throttle margin in the thermal report.

A $23^{rd}$ embodiment is to include elements of the $21^{st}$ embodiment, where the MCP is in one of an active state and a sleep state and the method further includes determining, by the power management logic, whether the MCP is in the active state.

A 24$^{th}$ embodiment is to include elements of the 23$^{rd}$ embodiment, and further includes responsive to determining that the MCP is in the active state, receiving by the power management logic the corresponding temperature data periodically from each die according to a first time period.

A 25$^{th}$ embodiment is to include elements of the 24$^{th}$ embodiment, and further includes responsive to determining that the MCP is in the sleep state, causing the MCP to change to the active state after a second time period has elapsed that is greater than the first period, and when the MCP is in the active state, receiving the corresponding temperature data.

A 26$^{th}$ T embodiment is to include elements of the 21$^{st}$ embodiment, and further includes providing the thermal report response to a request.

A 27$^{th}$ embodiment includes apparatus to perform the method of any one of embodiments 21-26.

A 28 embodiment includes apparatus that includes means to perform the method of any one of embodiments 21-26.

A 29$^{th}$ embodiment is an apparatus that is to include means for receiving corresponding temperature data from each die of a plurality of dies of a multi-chip package (MCP), means for determining a corresponding control temperature margin for each die based on the corresponding temperature data and on a respective control temperature of the die, means for determining a smallest control temperature margin from the control temperature margins, and means for storing a thermal report that includes the smallest control temperature margin.

A 30$^{th}$ embodiment is to include elements of the 29$^{th}$ embodiment, and further includes means for determining a smallest throttle margin of the dies based on a comparison of the die temperatures to a throttle temperature that is associated with reduction of activity of the MCP, and for including the smallest throttle margin in the thermal report.

A 31$^{st}$ embodiment includes elements of the 29$^{th}$ embodiment. The MCP is in one of an active state and a sleep state, and the apparatus further includes means for determining whether the MCP is in the active state.

A 32$^{nd}$ embodiment includes elements of the 31$^{st}$ embodiment, and further including means for, responsive to determining that the MCP is in the active state, receiving by the power management logic the corresponding temperature data periodically from each die according to a first time period.

A 33$^{rd}$ embodiment includes elements of the 32$^{nd}$ embodiment, further includes means for, responsive to determining that the MCP is in the sleep state, causing the MCP to change to the active state after a second time period has elapsed that is greater than the first period, and for receiving the corresponding temperature data when the MCP is in the active state.

A 34$^{th}$ embodiment includes elements of any one of embodiments 29-33, and further includes means for providing the thermal report response to a request.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a multi-die package substrate;
   a plurality of heterogeneous dies mounted on the multi-die package substrate, the plurality of heterogeneous dies comprising one or more dies of a first die type and one or more dies of a second die type;
   a first die of the first die type comprising:
      a first plurality of cores to execute instructions and process data;
      a first plurality of integrated voltage regulators, the first plurality of integrated voltage regulators associated with respective cores of the first plurality of cores;
      a shared cache coupled to the first plurality of cores;
      a first plurality of temperature sensors associated with the first plurality of cores to generate first temperature measurement data; and
   a second die of the second die type coupled to the first die over a bi-directional interconnect, the second die comprising:
      an input/output (IO) interface;
      a second temperature sensor integral to the second die to generate second temperature measurement data;
      a package-level management controller integrated on one of the plurality of heterogeneous dies to execute thermal management firmware to manage temperatures of the plurality of heterogeneous dies, the package-level management controller to:
         periodically read temperature values from the plurality of heterogeneous dies in accordance with a specified time period, including temperature values from the first plurality of temperature sensors, the second temperature sensor, and additional temperature values from additional dies of the plurality of heterogeneous dies, and
         process the temperature values to determine a thermal management result, wherein processing the temperature values includes determining a maximum temperature value;
      wherein a clock frequency of one or more of the plurality of heterogeneous dies is to be reduced based, at least in part, on the thermal management result.

2. The apparatus of claim 1, wherein the first die further comprises:
   a power control unit to reduce a clock frequency of one or more of the first plurality of cores.

3. The apparatus of claim 1, wherein the package-level management controller is to provide control information to an external voltage regulator via a digital interface to cause the external voltage regulator to generate a regulated voltage applied to one or more of the plurality of heterogeneous dies.

4. The apparatus of claim 1, wherein the first die comprises a plurality of power domains including a plurality of core power domains, each power domain comprising one or more integrated voltage regulators.

5. The apparatus of claim 4, wherein the plurality of power domains further include a non-core power domain.

6. The apparatus of claim 5, wherein the first die is partitioned into a plurality of clock domains, each clock domain to operate at a respective, independent frequency.

7. The apparatus of claim 1, wherein the first die further comprises:
an on-chip communication fabric coupled to the first plurality of cores.

8. The apparatus of claim 7, wherein the second die further comprises:
a memory controller to couple the second die to a system memory.

9. The apparatus of claim 7, further comprising:
a data interconnect coupled to the on-chip communication fabric; and
a data communication link coupled to the data interconnect, the data communication link to couple the first die to the second die.

10. The apparatus of claim 1, wherein processing the temperature values further comprises normalizing and aggregating the temperature values received from the plurality of heterogeneous dies.

11. An apparatus comprising:
a multi-die package substrate;
a plurality of dies mounted on the multi-die package substrate, the plurality of dies comprising one or more dies of a first die type and one or more dies of a second die type;
a first die of the first die type comprising:
a first plurality of cores to execute instructions and process data;
a first plurality of integrated voltage regulators, the first plurality of integrated voltage regulators associated with respective cores of the first plurality of cores;
a shared cache coupled to the first plurality of cores;
a first plurality of temperature sensors associated with the first plurality of cores to generate first temperature measurement data; and
a second die of the first die type comprising:
a second plurality of cores to execute instructions and process data;
a second plurality of integrated voltage regulators, the second plurality of integrated voltage regulators associated with respective cores of the second plurality of cores;
a shared cache coupled to the second plurality of cores;
a second plurality of temperature sensors associated with the second plurality of cores to generate second temperature measurement data;
a third die of the second die type coupled to the first die and the second die over an interconnect, the third die comprising an input/output (IO) interface;
a package-level management controller integrated on one of the plurality of dies to execute thermal management firmware to manage temperatures of the plurality of dies, the package-level management controller to:
periodically read temperature values from the plurality of dies in accordance with a specified time period, including temperature values from the first plurality of temperature sensors, the second plurality of temperature sensors, and additional temperature values from additional dies of the plurality of dies, and
process the temperature values to determine a thermal management result, wherein processing the temperature values includes determining a maximum temperature value;
wherein a clock frequency of one or more of the plurality of dies is to be reduced based, at least in part, on the thermal management result.

12. A system comprising:
a system memory to store program code and data;
a graphics processor coupled to the system memory to execute graphics commands;
a processor coupled to the system memory to execute the program code and process the data, the processor comprising:
a multi-die package substrate;
a plurality of heterogeneous dies mounted on the multi-die package substrate, the plurality of heterogeneous dies comprising one or more dies of a first die type and one or more dies of a second die type;
a first die of the first die type comprising:
a first plurality of cores to execute instructions and process data;
a first plurality of integrated voltage regulators, the plurality of integrated voltage regulators associated with respective cores of the first plurality of cores;
a shared cache coupled to the first plurality of cores;
a first plurality of temperature sensors associated with the first plurality of cores to generate first temperature measurement data; and
a second die of the second die type coupled to the first die over a bi-directional interconnect, the second die comprising:
an input/output (IO) interface;
a second temperature sensor integral to the second die to generate second temperature measurement data;
a package-level management controller integrated on one of the plurality of heterogeneous dies to execute thermal management firmware to manage temperatures of the plurality of heterogeneous dies, the package-level management controller to:
periodically read temperature values from the plurality of heterogeneous dies in accordance with a specified time period, including temperature values from the first plurality of temperature sensors, the second temperature sensor, and additional temperature values from additional dies of the plurality of heterogeneous dies, and
process the temperature values to determine a thermal management result, wherein processing the temperature values includes determining a maximum temperature value;
wherein processing the temperature values further comprises normalizing and aggregating the temperature values received from the plurality of heterogeneous dies; and
wherein a clock frequency of one or more of the plurality of heterogeneous dies is to be reduced based, at least in part, on the thermal management result to improve energy efficiency and performance of the system.

* * * * *